United States Patent
Tjensvoll et al.

(10) Patent No.: US 9,441,712 B1
(45) Date of Patent: Sep. 13, 2016

(54) BELT DRIVE WITH FIXED LARGE DISC

(71) Applicant: Vestas Wind Systems A/S, Aarhus N. (DK)

(72) Inventors: Gaute Tjensvoll, Oslo (NO); Stefan Franzen, Aachen (DE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/736,606

(22) Filed: Jun. 11, 2015

(51) Int. Cl.
*F16H 9/26* (2006.01)

(52) U.S. Cl.
CPC ........................................ *F16H 9/26* (2013.01)

(58) Field of Classification Search
None
See application file for complete search history.

(56) References Cited

U.S. PATENT DOCUMENTS

| | | | |
|---|---|---|---|
| 1,072,834 A | 9/1913 | Devlin | |
| 1,091,487 A | 3/1914 | Devlin | |
| 3,130,608 A | 4/1964 | Morin | |
| 3,543,690 A | 12/1970 | Lee | |
| 4,321,842 A * | 3/1982 | Stromotich | F16H 9/26 404/122 |
| 5,759,130 A * | 6/1998 | Woytaszek | F16H 1/46 475/339 |
| RE38,887 E * | 11/2005 | Bode | F16H 3/42 474/139 |
| 8,876,648 B2 * | 11/2014 | Kereth | F16H 7/02 475/182 |

FOREIGN PATENT DOCUMENTS

| | | |
|---|---|---|
| DE | 801801 C | 1/1951 |
| DE | 1702145 U | 7/1955 |
| DE | 2110757 A1 | 10/1971 |
| DE | 2513004 A1 | 9/1976 |
| DE | 2937827 A1 | 4/1981 |
| DE | 3213655 A1 | 10/1983 |
| DE | 3721993 A1 | 1/1989 |
| DE | 19808048 A1 | 9/1999 |
| EP | 2884133 A1 | 6/2015 |
| GB | 191118380 A | 6/1912 |
| JP | 2005023893 A | 1/2005 |
| WO | 2008028335 A1 | 3/2008 |
| WO | 2010086362 A2 | 8/2010 |
| WO | 2011134974 A2 | 11/2011 |

OTHER PUBLICATIONS

European Patent Office, search report issued in Application No. 13196949.5 dated Apr. 8, 2014.

* cited by examiner

*Primary Examiner* — Dirk Wright
(74) *Attorney, Agent, or Firm* — Wood, Herron & Evans, LLP (57) ABSTRACT

The invention relates to a transmission unit connected in one end to a driving unit, the transmission unit having a large belt disc with at least one large belt extending around and in contact with the large belt disc, and a high speed shaft. The transmission unit includes a planetary carrier being coupled to the driving unit, the planetary carrier carrying at least two planetary belt pulleys, each belt pulley having a belt pulley shaft which is in rotational coupling with the at least one large belt, each planetary pulley having at least one planetary belt, the planetary belt(s) rotationally coupling the planetary pulleys with the high speed shaft, the large belt disc being stationary mounted, the high speed shaft being coupled to a driven unit.

14 Claims, 7 Drawing Sheets

BELT DRIVE WITH FIXED LARGE DISC

TECHNICAL FIELD

The present invention in general relates to a drive device, which e.g., can be used for a wind turbine. The drive device is adapted to have a simplified and compact construction, ensures that the torque over the drive shaft is balanced, is lightweight and also has substantially reduced number of components and requires minimum maintenance.

BACKGROUND

In most of today's wind turbines the drive unit is placed in a nacelle, which also carries the wind turbine rotor. The nacelle is necessarily arranged on top of a high mast and rotates so that the rotor is always facing the wind.

Such placement of the drive unit results in a great weight at the top of the mast and that access for maintenance is a challenge. Yet it is this position of the drive unit and the generators that are used extensively as the alternative that the rotational torque must be transmitted via a shaft through the mast. This leads to losses and requires that the mast can absorb the reaction torque from the rotation shaft.

There is an urgent need to simplify the drive unit and make it lighter. There is also a need to make access for maintenance easier. These are the main aims of the present invention, and are achieved by the features that appear in the claims and described herein.

A drive unit for a wind turbine is described in publication WO2010/086362. This prior art relates to a wind turbine drive which uses belts to transmit the rotation from the rotor to a generator.

It is well known from WO 2008/028335 and JP2005023893 to use a belt to transmit the rotation from the rotor to a generator. However, the present invention aims to utilize the characteristics of the belt operation, or possibly the chain operation, better so that a more compact drive device could be achieved with additional operational benefits.

None of the abovementioned publications shows a drive unit with a planetary belt carrier with belt pulleys which are in rotational coupling with a stationary mounted large belt. The belt pulleys are also in rotational coupling with a shaft connected to the driven unit or a drive unit.

SUMMARY

The present invention aims to meet the above need hitherto not taught by prior art, by providing a specially constructed drive device for a wind turbine, which by virtue of its specially configured construction constitutes a lightweight and compact drive device and plays a significant role in running the electric generator smoothly and efficiently and gearing it up.

Another object of the present invention is to provide a drive device for a wind turbine apart from being compact and lightweight ensures that the torque over the drive shaft is balanced and simultaneously does not require heavy maintenance, due to lesser number of components.

All through the specification including the claims the words "large belt disc", "large belt", "high speed shaft", "planetary carrier", "planetary belt pulley", "belt pulley shaft", "planetary belt", "small belt pulley", and "wind turbine rotor" are to be interpreted in the broadest sense of the respective terms and include all similar items in the field known by other terms, as may be clear to persons skilled in the art. Restriction/limitation, if any, referred to in the specification, is solely by way of example and understanding the present invention.

In accordance with the invention, one embodiment provides a transmission unit connected in one end to a wind turbine generator, the transmission unit having a large belt disc with at least one large belt extending around and in contact with the large belt disc, and a high speed shaft. The invention is distinctive in that the transmission unit comprises a planetary carrier being coupled to the driving unit, the planetary carrier carrying at least two planetary belt pulleys, each belt pulley having a belt pulley shaft which is in rotational coupling with the at least one large belt, each planetary pulley having at least one planetary belt, the planetary belt(s) rotationally coupling the planetary pulleys with the high speed shaft, the large belt disc being stationary mounted, the high speed shaft being coupled to a driven unit.

The invention preferably comprises additional features, as defined in dependent claims.

The above embodiments thus reveal construction of a drive unit which is very compact, lightweight, simplified due to lesser number of the components and consequently need minimal maintenance. This arrangement also ensures that the torque over the high speed shaft is perfectly balanced and conversion of low rotational speed to high rotational speed. Consequently, greater speed is achieved thereby gaining high torque. Furthermore, this arrangement also ensures conversion of high rotational speed to low rotational speed.

BRIEF DESCRIPTION OF THE DRAWINGS

Having described the main features of the invention above, a more detailed and non-limiting description of some exemplary embodiments will be given in the following with reference to the drawings, in which.

DETAILED DESCRIPTION

Figure 1:
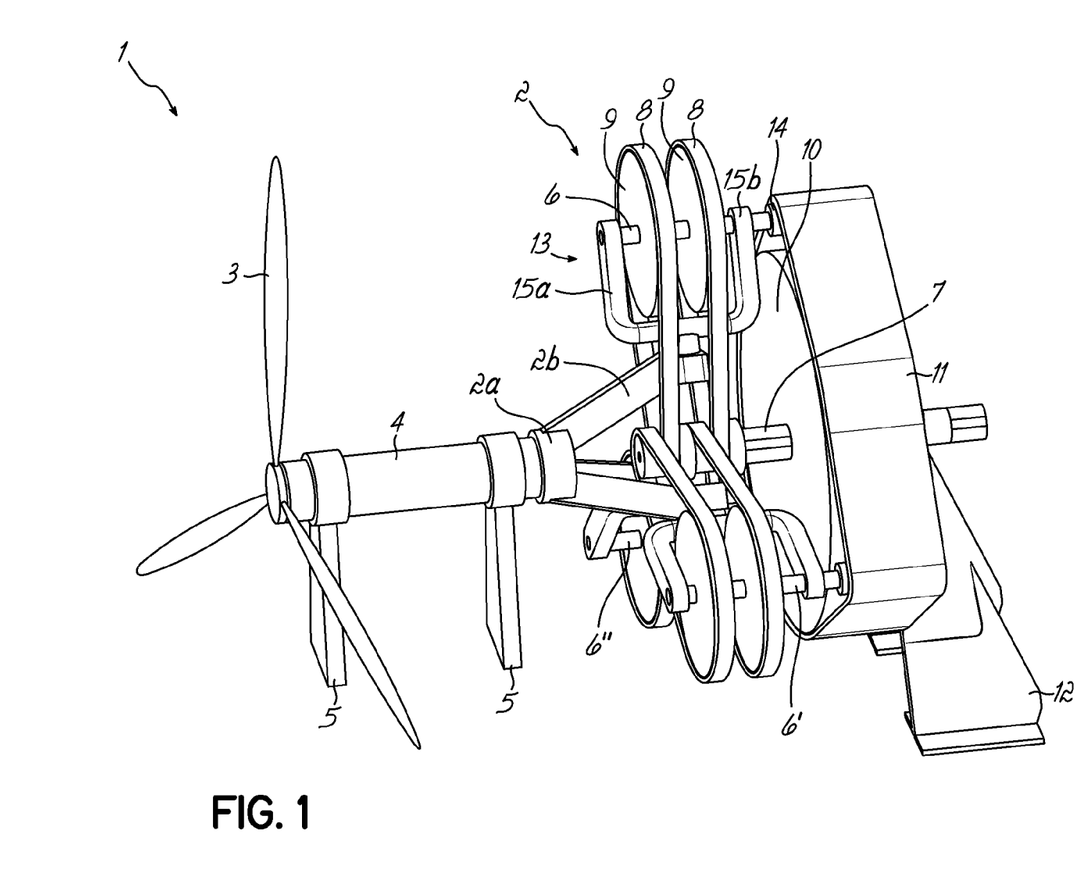
FIG. 1 is a perspective view of the drive device according to a preferred embodiment of the present invention with a wind turbine rotor attached to the drive device viewed from the side.
Figure 2:
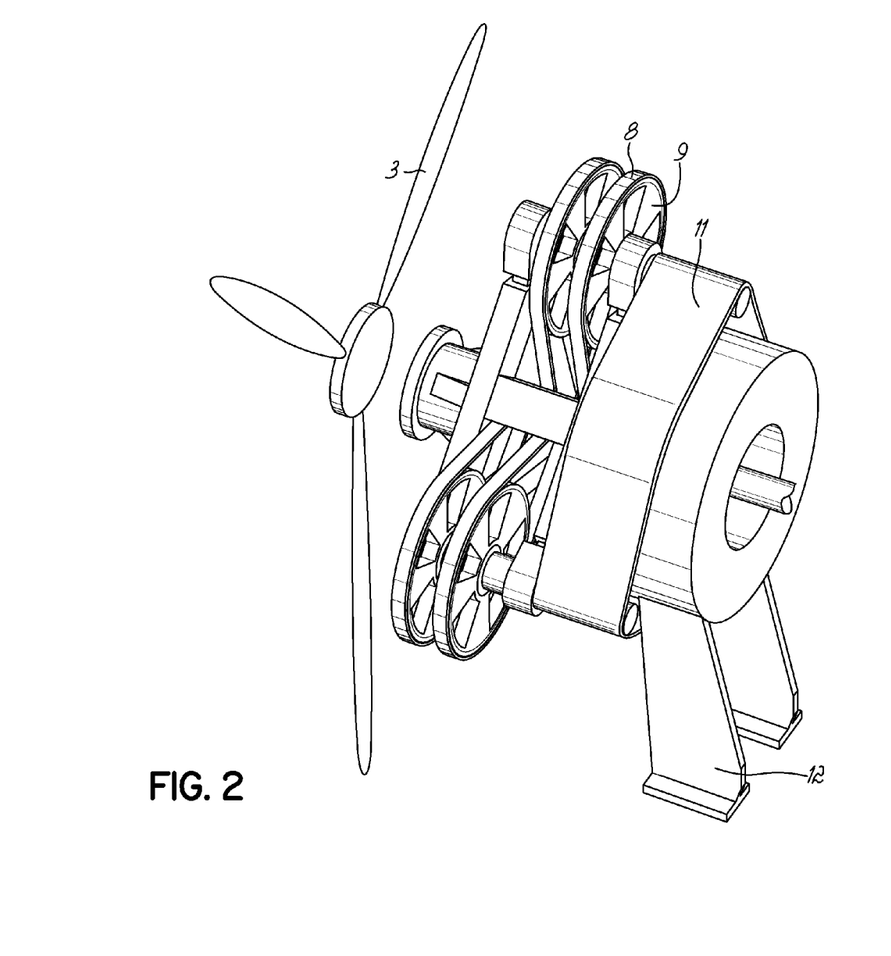
FIG. 2 is another perspective view of the drive device according to a preferred embodiment of the present invention with the wind turbine rotor end facing away.
Figure 3:
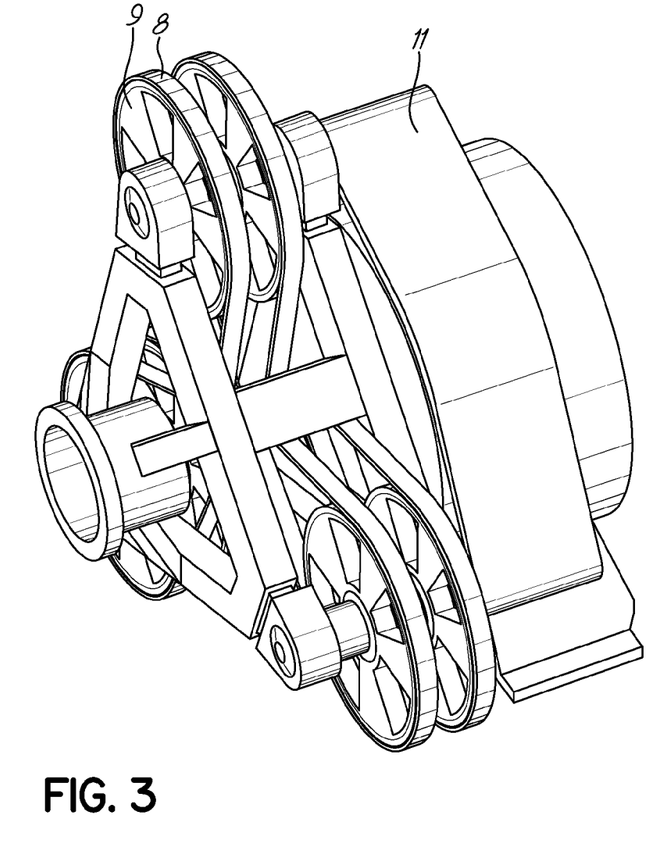
FIG. 3 is yet another perspective view of the drive device according to a preferred embodiment of the present invention with the generator end facing away.

The accompanying FIG. 1 illustrates an embodiment of the driving device for a wind turbine according to the present invention. The accompanying FIGS. 2 and 3 shows the same device in different angles. In this context it is hereby clarified that the wind turbine illustrated in the accompanied FIGS. 1-7 is only by way of example.

The components of the drive device 1 according to FIGS. 1, 2 and 3 are further explained in the following. The figures shows wind turbine rotor 3, a wind turbine shaft 4 connected to the wind turbine rotor 3, a transmission unit 2 such as a planetary belt drive device connected to the other end of the wind turbine shaft 4.

The drive device 1 further comprises a high speed shaft 7 which is in rotational coupling with the transmission unit 2 at one end and connected to a generator 15 (FIG. 4) at the other end of the high speed shaft 7. The high speed shaft 7 extends through a large belt disc 10 which is positioned between the transmission unit 2 and the generator 15. Bearings are disposed in the coupling between the high speed shaft 7 and the large belt disc 10 allowing the high speed shaft 7 to rotate within the large belt disc 10. At least one large belt 11 is extending around the large belt disc 10. The large belt disc 10 is provided with serrations (not shown) along respective circumferential surfaces for ensuring proper gripping during running condition. Further, each belt is provided with teeth/grooves (not shown) for ensuring proper gripping during running condition.

FIG. 1 further illustrates the drive device comprising one end 2a connected to the wind turbine shaft 4 facing the wind turbine rotor 3. The shaft 4 is in fixedly connection with both the wind turbine rotor 3 and the transmission unit 2 so that the wind turbine rotor 3 transfers rotation to the transmission unit 2. It should be understood to persons skilled in the art that other connections between the wind turbine rotor 3 and the planetary belt drive 2 are also possible. The wind turbine rotor 3 may for instance be coupled directly to the planetary belt drive 2 without using the wind turbine shaft 4. A clutch which controls the transmission of power motion mounted between the turbine rotor and the transmission unit is also a possible embodiment of the invention.

The transmission unit 2 comprises a planetary carrier 13, the large belt disc 10, the large belt 11 and the highs speed shaft 7.

The planetary carrier 13 will be further described in the following. The planetary carrier 13 shown in FIG. 1 has a structure with three legs 2b extending towards the large belt disc 10, the three legs having an angular distance from each other. Typically these would be distributed equally around the 360°. This structure may have other shapes intended for the purpose, for instance a vertical plate, circular or non-circular shape, compact or with a plurality of openings. The planetary carrier 13 comprises at the periphery or end of the structure 2, a U-shaped component with a first planetary carrier member 15a and a second planetary carrier member 15b which is connected to each of the legs 2b supporting a belt pulley shaft 6. The belt pulley shaft 6 extends from one of the free ends of the first planetary carrier member 15a, through the other free end of the second planetary carrier member 15b. The belt pulley shaft 6 is substantially parallel to the wind turbine shaft 4 and the high speed shaft 7. The belt pulley shaft 6 is rotatable relative the planetary carrier members 15a, 15b. A small belt pulley 14 is arranged at the free end of the belt pulley shaft 6, said pulley 14 is arranged between the large belt disc 10 and the large belt 11. It is also a possible embodiment of the invention that the end of the belt pulley shaft 6 facing the large belt disc 10 is in direct contact with the large belt 11, that is, without the small belt pulley 14 mounted on the belt pulley shaft 6.

At least one belt pulley 9 is connected to each of the belt pulley shafts 6, the shaft 6 passing through the center of the belt pulley 9. The belt pulley and the small belt pulley 14 are rotationally coupled to the same belt pulley shaft 6.

All the pulleys may be provided with serrations along respective circumferential surface for ensuring gripping during running condition.

Preferably each belt is provided with teeth/grooves for ensuring proper gripping during running condition.

A small planetary belt 8 is extending around each of the belt pulley 9 and the high speed shaft 7. The belt pulley 9 and the high speed shaft 7 are in rotatable connection.

In the FIGS. 1-3 there is shown a possible embodiment of the invention with a planetary carrier 13 with three belt pulley shafts 6, where at each belt pulley shaft 7 there are arranged two belt pulleys 9 and two planetary belts 8 parallel to each other.

It should also be understood to persons skilled in the art that the drive device according to the present invention is applicable with other designs of the planetary carrier 13. It is a possible embodiment of the invention that belt pulley shaft 6 having two or more planetary belt pulleys 9 arranged parallel to each other and rotationally coupled to the same belt pulley shaft 6. A single planter belt pulley arranged on the belt pulley shaft is also an embodiment of the invention.

Each angular positioned planetary belt pulley 9 could also have one or more planetary belts 8 arranged parallel to each other on the planetary belt pulleys 9.

A reduction or increasing of the number of belt pulley shafts 6 mounted on the planetary carrier 13 are also possible embodiments of the invention, it is crucial to the performance of the invention that the number of belt pulleys shafts 6 is two or more.

There are also support members (5, 12) to support the structure. In the drawings the support members 5 are connected to the wind turbine shaft 4 and brackets 12 connected to the large belt disc.

Now the rotational connections are achieved by a system of operatively connected planetary belts 8. This facilitates that the construction of the drive unit 1 is very compact, lightweight, simplified due to lesser number of the components and consequently needs minimal maintenance. This also ensures that the torque over the drive shaft is perfectly balanced. Due to very simplified connectivity between the various components in rotational motion, through a simple arrangement of planetary belts 8, the requirement for increased number of components is done away with, which was hitherto unknown. This arrangement also ensures conversion of low rotational speed to high rotational speed and achieving greater speed. Consequently, gaining high torque is also ensured. How the drive device works through a simple arrangement of belts is now explained below with reference to the accompanying FIGS. 4-7.

Figure 4:
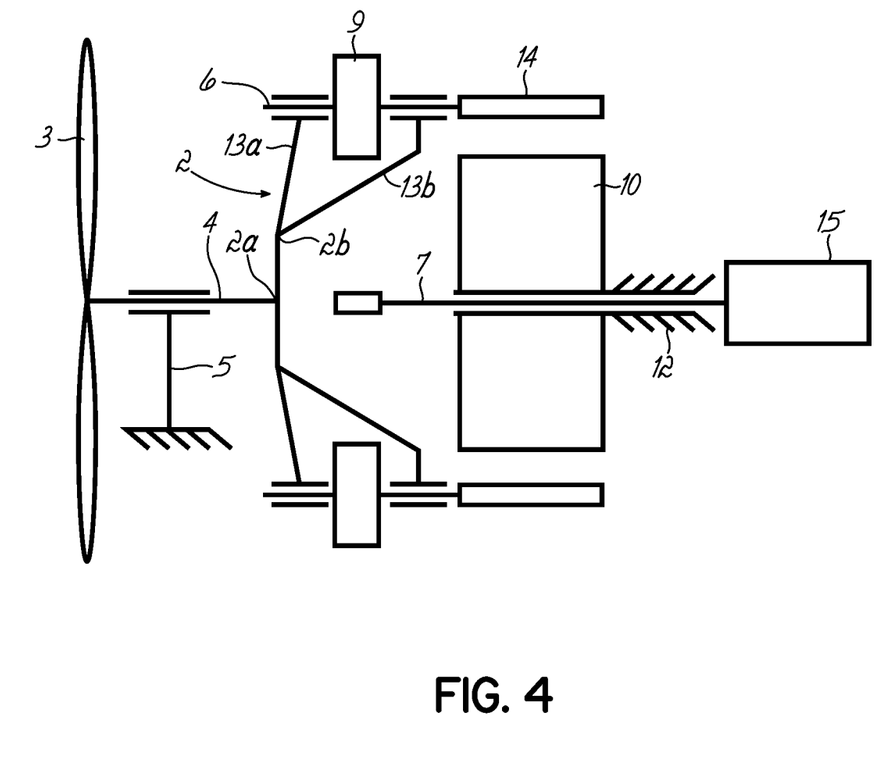
FIG. 4 is a schematic view of the drive device according to a preferred embodiment of the present invention viewed from the top.

FIG. 4 is a schematic view of the drive device described in FIGS. 1-3 without belts. The lines highlighted are stationary parts of the drive device 1 and the other lines are rotatable parts of the drive device 1.

Figure 5:
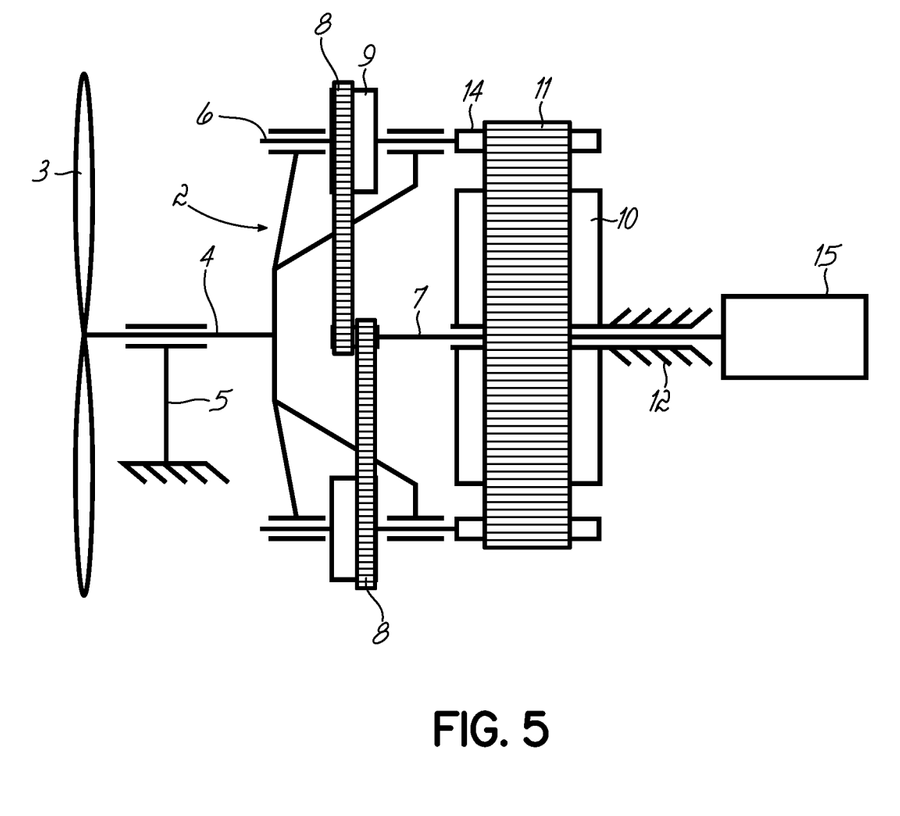
FIG. 5 is a schematic view of the drive device according to another preferred embodiment of the present invention, viewed without belts on the drive device.

FIG. 5 is a schematic view of the drive device described in FIGS. 1-4 with belts.

The rotation of the wind turbine rotor 3 will lead to a rotation of the planetary carrier 13 in the same direction as the wind turbine rotor 3. This will in turn be transmitted to the small belt pulley 14 because of the rotational movement of the small belt pulley 14 relative the large belt 11. The belt pulley 9 and the belt pulley shaft 6 will in turn rotate in the same direction as the small belt pulley 14 and the rotation will be transmitted to the high speed shaft 7 and on to the generator 15 via the planetary belt 8. If there is no small belt pulley 14 the belt pulley shaft 6 is in direct rotational coupling with the large belt 11.

The belt pulley 9 has a significantly larger diameter than the high speed shaft 7; this will cause a larger rotational speed of the high speed shaft 7 than the rotational speed of the belt pulley 9.

Figure 6:
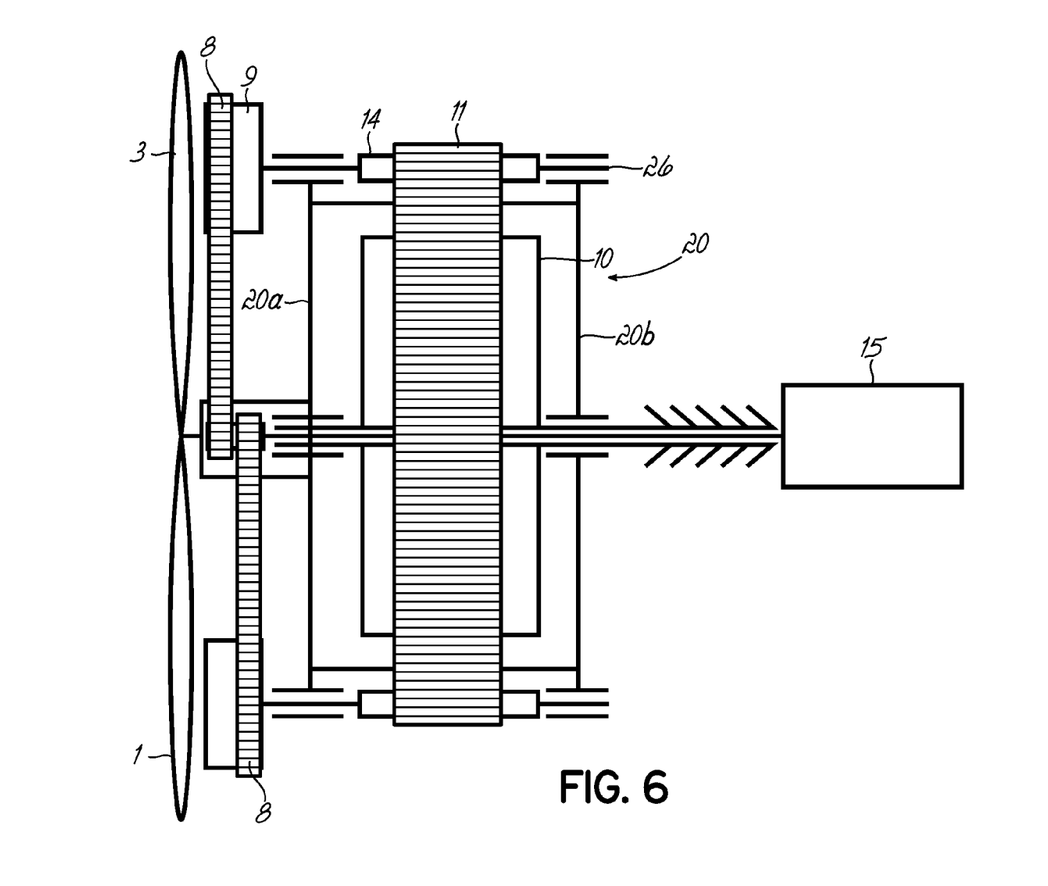
FIG. 6 is a schematic view of the drive device shown in the accompanying FIG. 5 with the belts.

FIG. 6 shows another possible embodiment of the invention where the planetary carrier 20 is arranged with one member on each side of the large belt disc 10, a first planetary member 20a is arranged between the wind turbine rotor 3 and the belt disc 10, and a second planetary member 20b is arranged between the large belt disc 10 and the generator 15. In this embodiment of the invention the belt pulley shaft 26 extends from belt pulley 9 through the first planetary member 20a and the small belt pulley 14, arranged between the belt 11 and the belt disc 10, to the second planetary member 20b.

Figure 7:
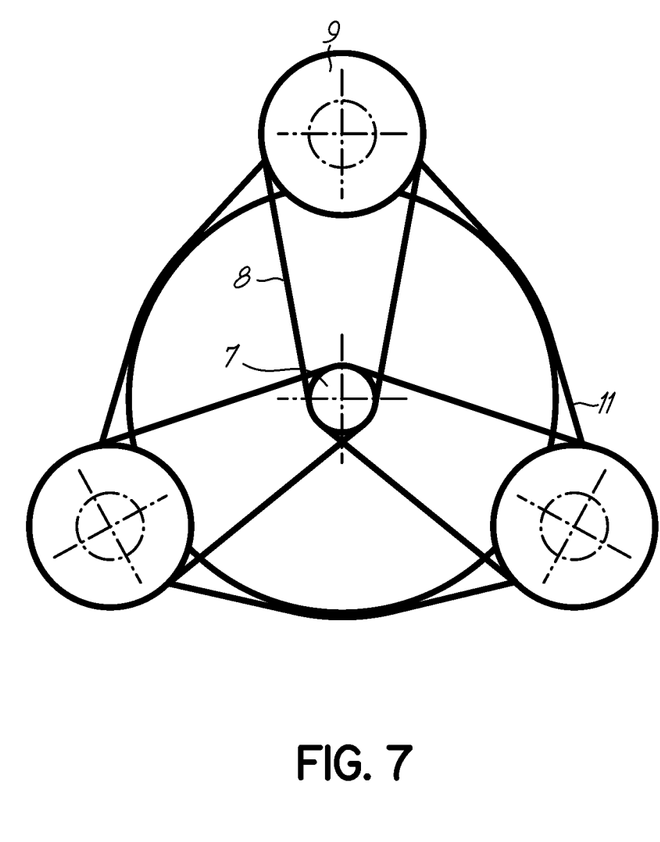
FIG. 7 is a schematic view of the planetary carrier according to a preferred embodiment of the present invention.

FIG. 7 is a schematic view of the planetary gear with three belt pulley 9 arranged at a substantially equal angular distance from each other. It would however be clear to a person skilled in the art that the belt pulleys 9 could have other angular positions that are more suitable according to the present invention.

The present invention has been described with reference to some preferred embodiments and some drawings for the sake of understanding only and it should be clear to persons skilled in the art that the present invention includes all legitimate modifications within the ambit of what has been described hereinbefore and claimed in the appended claims.

In additional embodiments, the invention may be used in combination with teaching from EP2391825B1, the disclosure of which is incorporated by reference herein in its entirety. Some of the benefits that may be achieved hereby in relation to the belt operation, according to the known solutions, are:

i) one gets a doubling of the utilisation of the capacity of the belts with respect to the known belt operation. This relates, in particular, to large (and therefore costly) belts and associated large belt wheels;

ii) the structure becomes more compact;

iii) the torque over the drive shaft is balanced;

iv) the generation of power can be divided onto two generators that can be open to a more reasonable generator control system; and v) the time before one needs to replace belts can be made longer because one can drive the torque on a single generator when there is little wind.

In comparison to traditional drive systems with cogged wheel transfer, or direct operation, one may achieve the following benefits:

i) reduction of shock loads (large momentum changes, vibration, etc. are dampened);

ii) makes complex lubrication and cooling systems unnecessary;

iii) the system will be less prone to corrosion and have lower maintenance needs. This is particularly relevant for offshore wind turbines. The belt wheels can, for example, be given a zinc coating to reduce corrosion, something that is not possible with cogged wheel transmissions;

iv) a weight saving is achieved by integrating the drive shaft in the belt wheel and also by taking up the torque over a large radius instead of a small radius inside a gearbox;

v) the number of parts that must be manufactured in the production of the drive system is significantly reduced;

vi) a large part of the maintenance can be done without the use of a large crane;

vii) the belts are most susceptible to wear, but even the big belts do not weigh more than 70-100 kg;

viii) the belt wheel will not be subjected to wear as the belt is soft;

ix) scaling up to, for example, 5, 7 and 10 MW, will be possible without the mass of the drive system increasing exponentially. The mass of a 5 MW turbine with gearbox or direct drive will quickly become very heavy;

x) the power from the rotor can be distributed to several standard generators, something which results in increased flexibility;

xi) a larger exchange can be brought about in one step than with cogged wheel transmission. This is because a large exchange in cogged wheel transmissions leads to high pressure forces on the cogs, something which results in much wear. With a belt operation, there will be a softer transmission and some slip may be acceptable at abrupt torque changes; and xii) a belt drive system also has advantages compared with direct operation. With direct operation a relatively low rotational speed is transmitted to the generator. This means that the generator must be large and heavy. At higher rotational speeds one can use smaller and lighter generators.

The embodiments of EP2391825B1 shall now be explained in more detail with reference to the drawings of EP2391825B1.

The known nacelle according to FIG. 1 comprises a rotor hub 1 to which the wind turbine blades (not shown) are attached. The hub 1 is mounted in a main bearing 2 and is connected to a main shaft 3. The main shaft is connected to a main gear 4. The gear 4 is fitted with a brake 5. The gear is connected to a generator 7 via a connection 6. The nacelle is also fitted with a swivel bearing 8, swivel gear 9 and swivel ring 10 for rotation of the nacelle in relation to a tower 11, on which the nacelle is placed.

EP2391825B1 aims to replace the following components in the known nacelle above: the main shaft 3, the main gear 4, the brake 5 and the connection 6.

FIG. 2 shows the nacelle in FIG. 1 with the drive device placed at an intended location and with the known nacelle as a background.

However, before FIG. 2 is explained, the drive device shall be explained with reference to the FIGS. 3-5, which show the drive device separate from the nacelle.

The drive device is mounted in a frame 12, which has a first opening 13 at the one end that faces away from the hub 1 and a second opening 14 at its other end facing towards the hub 1. The opening 14 is circular and is set up to receive a rotation bearing 15. The frame also includes a load-carrying wall 16 for a main shaft bearing 17. The load-carrying wall 16 is equipped with openings 18 and 19. The frame 12 is designed at the bottom to take up a swivel bearing for rotation of the nacelle in relation to the tower. The frame also has an opening 20 in this area.

A large belt disc wheel 21 is mounted between the swivel bearing 15 and main shaft bearing 17 with the help of a main shaft 22. Two secondary shafts 23 and 24 are mounted in parallel with the large belt disc 21 and the main shaft 22. Each of these is fitted with a small belt disc 25, 26 at the ends facing away from the hub 1. A set of belts 27 extends around the large belt disc 21 and the secondary shafts 23, 24 to transmit the rotation torque from the large belt disc 21 to the secondary shafts 23, 24. The secondary shafts 23, 24 are mounted between brackets 28, 29 at the side of the opening 14 and the load-bearing wall 16. Two generators 30, 31 are attached to the frame 12 and have generator shafts 32, 33 that extend through the load-bearing wall 16. These generator shafts 32, 33 are in rotational connection with each of the small belt discs 25, 26 via sets of belts 34, 35.

The large belt disc 21 is provided with spokes 36 so that four openings 37 are formed through the belt disc 21 itself.

The above mentioned results in a compact unit that can form a load-bearing part of the nacelle. FIG. 2 shows how this unit will be placed in the nacelle. The hub will be connected directly to the large belt disc 21 by means of a number of bolts that are screwed into the bolt holes 38 in the belt disc 21. Thus the rotation of the hub will lead to a rotation of the large belt disc 21. This will in turn be transmitted to the secondary shafts 23, 24 via the belts 27 and on to the generators 30, 31 via the small belt discs 25, 26 and the belts 34, 35. Since the large belt disc 21 has a significantly larger diameter than the secondary shafts 23, 24, even a small rotational speed of the hub will cause a large rotational speed of the secondary shafts 23, 24. A very large exchange in one step is thereby achieved.

The parallel and diametrically opposite secondary shafts 23, 24 provide a good balance the large belt disc 21. The tightening of the belt can be adjusted by moving the secondary shafts sideways, as is suggested by the oblong holes 39 in the brackets 28, 29 and the load-bearing wall 16. The tightening of the belts 34, 35 can be carried out in a similar way, by displacing the generators 30, 31 sideways, as is indicated by the oblong holes 40 in the load-bearing wall 16.

If the wind is weaker than that required to provide half the power production, one of the generators can be disconnected. The possibility to disconnect half of the generator power means that one can achieve a wider regulating range for the wind turbine where there is little wind, than with the help of a single generator and conventional double-fed generator control.

Although two secondary shafts and two generators are described in the above, there is nothing in the way of using several secondary shafts and generators. A principle diagram of a system with three secondary shafts 23a, 23b, 23c, which by way of the one set of belts 27 is in rotational connection with a large belt disc 21, is shown in FIG. 6. Instead of belts 27, 34, 35, one or more chains that engage with the cogs of the large disc and the secondary shaft can also be used.

Instead of each of the secondary shafts being in connection with their own generator, these can be rotationally connected with a common generator. An example of this is shown in FIG. 7, where the small belt discs 25, 26 are connected via a belt disc set 34, 35 to a common generator shaft 32a that goes into a common generator 30a.

The way the frame 12 is designed and the way the drive unit is positioned in the frame, offer good access for inspection and maintenance. Personnel can come up in the frame 12 via the opening 20, which is in connection with an opening at the top of the tower. From here, the personnel can get to the back of the nacelle via the opening 13 and to the front via the opening 18 or 19. Moreover, it is possible to crawl through the large belt disc 21 itself via one of the openings 37 and from here into the hub.

The drive device will also be equipped with a brake which will ensure that nothing rotates while there are people in the nacelle. This brake will most appropriately be arranged at the two small belt discs or on the generators and be active until the maintenance personnel have manually locked the large belt disc and the hub.

In yet further embodiments, the invention may be used in combination with teaching from WO2015/058770, the disclosure of which is incorporated by reference herein in its entirety. Some of the benefits that may be achieved hereby are mentioned in the following.

The teaching of WO2015/058770 discloses a wind turbine comprising: a nacelle, a hub carrying one or more rotor blades, the hub being rotatably mounted on the nacelle, a rotating shaft arranged to be connected to a generator in order to transfer rotational movement to the generator, and a gear arrangement arranged to transfer rotational movements of the hub to rotational movements of the rotating shaft, the gear arrangement comprising a number of pulleys and a number of belts interconnecting the pulleys in order to transfer rotational movements between the pulleys, thereby transferring rotational movements from the hub to the rotating shaft, wherein the hub is arranged between the gear arrangement and the nacelle.

The wind turbine comprises a nacelle. The nacelle is typically a substantially closed housing mounted on top of a tower or pylon, in such a manner that the nacelle is capable of performing yawing movements relative to the tower or pylon. This allows the rotor blades of the wind turbine to be positioned in a desired direction, relative to the wind direction.

The wind turbine further comprises a hub carrying one or more rotor blades. The hub is mounted on the nacelle in a rotatable manner. Thereby, during operation of the wind turbine, the wind is caught by the rotor blade(s) in such a manner the energy of the wind is transformed into rotational movements of the hub.

A rotating shaft is arranged to be connected to a generator in order to transfer rotational movement to the generator. Thus, the rotating shaft operates as an input shaft to the generator, i.e. when the rotating shaft rotates, energy is transferred to the generator in the form of rotational movement.

Finally, the wind turbine comprises a gear arrangement arranged to transfer rotational movements of the hub to rotational movements of the rotating shaft. Accordingly, when the hub rotates due to the wind acting on the rotor blade(s), this rotational movement is transferred to the rotating shaft, and thereby to the generator, via the gear arrangement. The gear arrangement is preferably a speed increasing gear arrangement, i.e. the rotational speed of the rotating shaft is preferably higher than the rotational speed of the hub.

The gear arrangement comprises a number of pulleys and a number of belts interconnecting the pulleys. Rotational movements are transferred between the pulleys by means of the belts. Thus, the gear arrangement is in the form of a belt drive. This is an advantage, since the weight of a belt drive is typically significantly lower than the weight of a corresponding gear arrangement using intermeshing toothed gear wheels.

In the present context the term 'pulley' should be interpreted to mean any suitable member for the purpose known to a skilled person in the art, such as a relatively flat object, having a substantially circular shape.

The hub is arranged between the gear arrangement and the nacelle. Thus, the gear arrangement, the hub and the nacelle are arranged relative to each other in such a manner that, seen in a direction from the nacelle, the hub is first encountered, and subsequently the gear arrangement. Accordingly, the gear arrangement may be regarded as being arranged in front of the hub. Furthermore, the gear arrangement and the nacelle may be regarded as being positioned at opposing sides of the hub, along an axial direction. This allows the belts of the gear arrangement to be easily inspected and replaced, because they are readily accessible. On the contrary, the gear arrangement disclosed in EP2391825B1, is arranged in the nacelle, thereby making it difficult to replace the belts of the gear arrangement without dismantling either the generator or the hub. To this end it is noted that belts, contrary to chains, cannot be dissembled without breaking the belts. It is therefore necessary to be able to move the belts in a substantially axial direction in order to replace the belts. Accordingly, it is a great advantage that the hub is arranged between the gear arrangement and the nacelle, as described above, because this arrangement allows the belts to be removed and positioned along a substantially axial direction. A yet further advantage is that there is less need for shielding in the nacelle in that the belt drive is placed in the hub, where it is not possible to be while the turbine is running.

The gear arrangement may comprise: a primary pulley being rotationally decoupled from the hub, two or more planetary pulleys, each planetary pulley being mounted on the hub, thereby rotating along with the hub, and each planetary pulley being provided with a planetary shaft, each planetary pulley being arranged to perform rotational movements about its planetary shaft, and a centre pulley being connected to the rotating shaft, wherein at least one belt may interconnect the primary pulley to each of the planetary shafts, and at least one belt may interconnect each of the planetary pulleys to the centre pulley.

According to this embodiment, the pulleys of the gear arrangement are mounted in a planetary manner with a primary pulley, two or more planetary pulleys and a centre pulley. The primary pulley is rotationally decoupled from the hub, i.e. the primary pulley does not rotate along with the hub when the wind acts on the rotor blade(s). The primary pulley may be fixedly mounted relative to the nacelle, or it may be arranged to perform rotational movements relative to the nacelle, as long as these rotational movements are not following the rotational movements of the hub. Accordingly, when the hub rotates, a relative rotational movement occurs between the hub and the primary pulley.

Each of the planetary pulleys is mounted on the hub, i.e. the planetary pulleys rotate along with the hub when the hub rotates due to the wind acting on the rotor blade(s). Thereby a relative rotational movement between the primary pulley and the planetary pulleys is also provided, when the hub rotates.

Each of the planetary pulleys is further provided with a planetary shaft, and each planetary pulley is arranged to perform rotational movements about its planetary shaft. Thus, apart from rotating along with the hub, each planetary pulley is also capable of performing individual rotational movements about the corresponding planetary shaft.

The centre pulley is connected to the rotating shaft. Thereby rotational movements of the centre pulley are directly transferred to the rotating shaft.

At least one belt interconnects the primary pulley to each of the planetary shafts. Thereby the relative rotational movement between the primary pulley and the planetary pulleys drives rotational movements of each of the planetary pulleys about their respective planetary shafts, via the at least one belt. One belt may interconnect the primary pulley and a given planetary shaft. In this case the belts of the respective planetary shafts may be arranged side by side on the primary pulley. As an alternative, the primary pulley and a given planetary shaft may be interconnected by two or more belts, the belts being arranged side by side on the primary pulley, as well as on the planetary shaft.

Furthermore, at least one belt interconnects each of the planetary pulleys to the centre pulley. Thereby the rotational movements of the planetary pulleys, about their respective planetary shafts, drives a rotational movement of the centre pulley, and thereby of the rotating shaft, via the at least one belt. As described above, a single belt or two or more belts arranged side by side may be applied.

The wind turbine may further comprise a hollow king pin, wherein the primary pulley is mounted fixedly on the hollow king pin.

As earlier mentioned, the weight of a belt drive is typically significantly lower than the weight of a corresponding gear arrangement using intermeshing toothed gear wheels. Hereby it is possible to use a king pin solution of a relatively thin size as compared to e.g. the solution shown in EP2525090, which does not really show a king pin solution but instead more or less a prolonged nacelle structure in order to carry the higher weight.

The hub may be rotationally mounted on the king pin via a main bearing arrangement. According to this embodiment, the hub rotates relative to the king pin. The king pin may advantageously extend through the hub and be fixedly mounted relative to the nacelle. The main bearing arrangement may comprise a single bearing, or it may comprise two or more bearings arranged along an axial direction defined by the king pin.

At least part of the rotating shaft may be arranged inside the hollow king pin. According to this embodiment, the rotating shaft may extend through the hollow king pin in order to interconnect the gear arrangement, arranged at one end of the king pin, and a generator arranged at an opposite end of the king pin. This allows a compact design of the wind turbine, and it further allows rotational movements to be transferred from the gear arrangement arranged in front of the hub to a generator, e.g. arranged in the nacelle behind the hub.

Thus, the wind turbine may further comprise a generator, which may be arranged inside the nacelle.

As an alternative, the wind turbine may further comprise one or more generators, wherein the generator(s) is/are arranged inside the hub or on the hub. According to this embodiment, a hollow king pin may not be required, because it is possible to transfer rotational movements directly from the gear arrangement, arranged in front of the hub, to the generator arranged inside the hub. Thus, there is no need for transferring the rotational movements through the hub. A single generator may be provided, e.g. connected to a centre pulley via a single rotating shaft. As an alternative, two or more generators may be provided. For instance, a generator may be connected to each of the planetary shafts, instead of connecting the planetary shafts to a centre pulley. Or generators may be mounted directly on the hub instead of planetary shafts.

At least part of the gear arrangement may be partly enclosed by the hub. According to this embodiment, a part of the hub extends in a direction towards the gear arrangement, in such a manner that it encloses a part of the gear arrangement. It should, however, be noted that the gear arrangement is still arranged in front of the hub in the sense that a part of the hub is arranged between the gear arrangement and the nacelle, i.e. that the gear arrangement and the nacelle are arranged at opposing sides of the hub, along an axial direction. The entire gear arrangement may be arranged inside such an extension of the hub. Alternatively, only part of the gear arrangement, for instance a primary pulley, may be arranged within the extension of the hub, while the remaining part of the gear arrangement, such as one or more planetary pulleys and a centre pulley, may be arranged outside the hub.

The embodiments of WO2015/058770 shall now be explained in more detail with reference to the drawings of WO2015/058770.

FIGS. 1-4 are perspective views of a wind turbine 1 according to an embodiment. FIGS. 1-4 show the wind turbine 1 from various angles, and some parts, such as a nacelle cover, a hub cover, a yaw arrangement and rotor blades, have been omitted in order to show elements arranged inside the nacelle and the hub.

The wind turbine comprises a nacelle (nacelle cover not shown) mounted on top of a tower 3. A hub 4, only part of which is shown, is mounted rotatably on the nacelle. Accordingly, wind acting on rotor blades (not shown), carried by the hub 4, causes the hub 4 to rotate relative to the nacelle about a substantially horizontal axis.

The hub 4 is mounted on a hollow king pin 5 via two bearings 6 constituting a main bearing arrangement. It is noted that even though the use of ball bearings is shown here, other types of bearings may also be used, such as a slide bearing.

The wind turbine 1 further comprises a gear arrangement 7 mounted in front of the hub 4 in the sense that the hub 4 is arranged between the gear arrangement 7 and the nacelle. The gear arrangement 7 comprises a primary pulley 8, three planetary pulleys 9, each being provided with a planetary shaft 10, and a centre pulley 11. The centre pulley 11 is connected to a rotating shaft (not shown) which is arranged to transfer rotational movements from the centre pulley 11 to a generator 12 arranged inside the nacelle. The rotating shaft extends through the hollow king pin 5.

The primary pulley 8 is mounted fixedly on the hollow king pin 5, and the planetary pulleys 9 are mounted on the hub 4. Furthermore, the primary pulley 8 is connected to each of the planetary shafts 10 via one or more belts (not shown), and each of the planetary pulleys 9 is connected to the centre pulley 11 via one or more belts (not shown). Thus, when the hub 4 rotates, a relative rotational movement between the primary pulley 8 on the one hand, and the planetary pulleys 9 and the planetary shafts 10 on the other hand, is introduced. Due to the belt connection between the primary pulley 8 and the planetary pulleys 9 and shafts 10, this will cause each of the planetary shafts 10 to be rotated, and thereby each of the planetary pulleys 9 will perform a rotational movement about its planetary shaft 10.

Due to the belt connections between each of the planetary pulleys 9 and the centre pulley 11, the rotational movements of the planetary pulleys 9 described above will cause the centre pulley 11, and thereby the rotating shaft, to rotate. Accordingly, rotational movements are transferred from the hub 4 to the generator 12, via the gear arrangement 7 and the rotating shaft.

Since the gear arrangement 7 is arranged in front of the hub 4, i.e. the hub 4 is arranged between the gear arrangement 7 and the nacelle, the gear arrangement 7 is readily accessible. In particular, the belts of the gear arrangement 7 can easily be removed from the gear arrangement 7 by pulling them in a direction away from the hub 4. Thereby the belts can be replaced without having to disassemble the hub 4 or the generator 12.

FIG. 5 is a cross sectional view of a wind turbine 1 according to an embodiment. The embodiment shown in FIG. 5 is very similar to the embodiment shown in FIGS. 1-4, and it will therefore not be described in further detail here. In FIG. 5 one of the rotor blades 13 is shown. Furthermore, it can be seen that the king pin 5 is hollow, and that the rotating shaft 14 extends through the hollow king pin 5, interconnecting the centre pulley 11 and the generator 12.

A belt 15 encircles the primary pulley 8 and each of the planetary shafts 10, and three belts 16 each encircles one of the planetary pulleys 9 and the centre pulley 11.

FIG. 6 is a front view of the gear arrangement 7 of the wind turbine 1 of FIG. 5. It can be seen how the belt 15 encircles the primary pulley 8 and each of the planetary shafts 10, and how the belts 16 each encircles one of the planetary pulleys 9 and the centre pulley 11.

As already indicated, the present invention should not be limited to any specific single embodiment shown herein, but may be any kind of combination between the teaching herein, the teaching of EP2391825B1 and the teaching of WO2015/058770 as described herein.

While the invention has been particularly shown and described with reference to the preferred embodiments thereof it will be understood by those skilled in the art that the foregoing and other changes in form and detail may be made without departing from the scope of the invention.

What is claimed is:

1. A wind turbine generator comprising a transmission unit connected in one end to a driving unit, said transmission unit having a large belt disc with at least one large belt extending around and in contact with the large belt disc, and a high speed shaft wherein the transmission unit comprises a planetary carrier being coupled to said driving unit, said planetary carrier carrying at least two planetary belt pulleys, each belt pulley having a belt pulley shaft which is in rotational coupling with the at least one large belt, each planetary pulley having at least one planetary belt, said planetary belt(s) rotationally coupling said planetary pulleys with said high speed shaft, said large belt disc being stationary mounted, said high speed shaft being coupled to at least one generator.

2. The wind turbine generator according to claim 1, wherein the transmission unit includes three planetary pulleys at separate angular positions.

3. The wind turbine generator according to claim 1, wherein each angular positioned planetary belt pulley includes at least two planetary belts arranged parallel to each other on the planetary belt pulleys.

4. A wind turbine generator according to claim 3, wherein each belt pulley shaft includes two planetary belt pulleys arranged parallel to each other and rotationally coupled to the same belt pulley shaft.

5. The wind turbine generator according to claim 1, wherein the belt pulley shaft is coupled to a small belt pulley, said small belt pulley being in contact with the large belt.

6. The wind turbine generator according to claim 1, wherein the belt pulley shaft is in direct contact with the large belt.

7. The wind turbine generator according to claim 1, wherein said belt pulley shaft is connected to a bearing mechanism on the rear side of said large belt disc.

8. The wind turbine generator according to claim 1, wherein the planetary belt carrier has a first planetary carrier member and a second planetary carrier member, the first and second carrier member being arranged on opposite axial side of the large belt disc, the belt pulley shaft extending from the at least one belt pulley through said first planetary member, the gap between the large belt and the large belt disc to the second planetary member.

9. The wind turbine generator according to claim 1, wherein the large belt comprises of two or more belts arranged parallel to each other on the large belt disc.

10. The wind turbine generator according to claim 1, wherein the planetary carrier has a structure with at least two, such as three, legs extending towards the large belt disc.

11. The wind turbine generator according to claim 1, wherein the planetary carrier comprises at least one U-shaped component with a first planetary carrier member and a second planetary carrier member which is connected to each of the legs supporting said belt pulley shaft.

12. The wind turbine generator according to claim 1, wherein said belt pulley shaft extends from one of the free ends of the first planetary carrier member, through the other free end of the second planetary carrier member.

13. The wind turbine generator according to claim 1, wherein at least one pulley is provided with serrations along respective circumferential surface for ensuring gripping during running condition.

14. The wind turbine generator according to claim 1, wherein at least one belt is provided with teeth/grooves for ensuring proper gripping during running condition.

* * * * *